July 6, 1965
J. M. DREES ETAL
3,193,019
ROTOR SYSTEM
Filed June 5, 1964
2 Sheets-Sheet 1
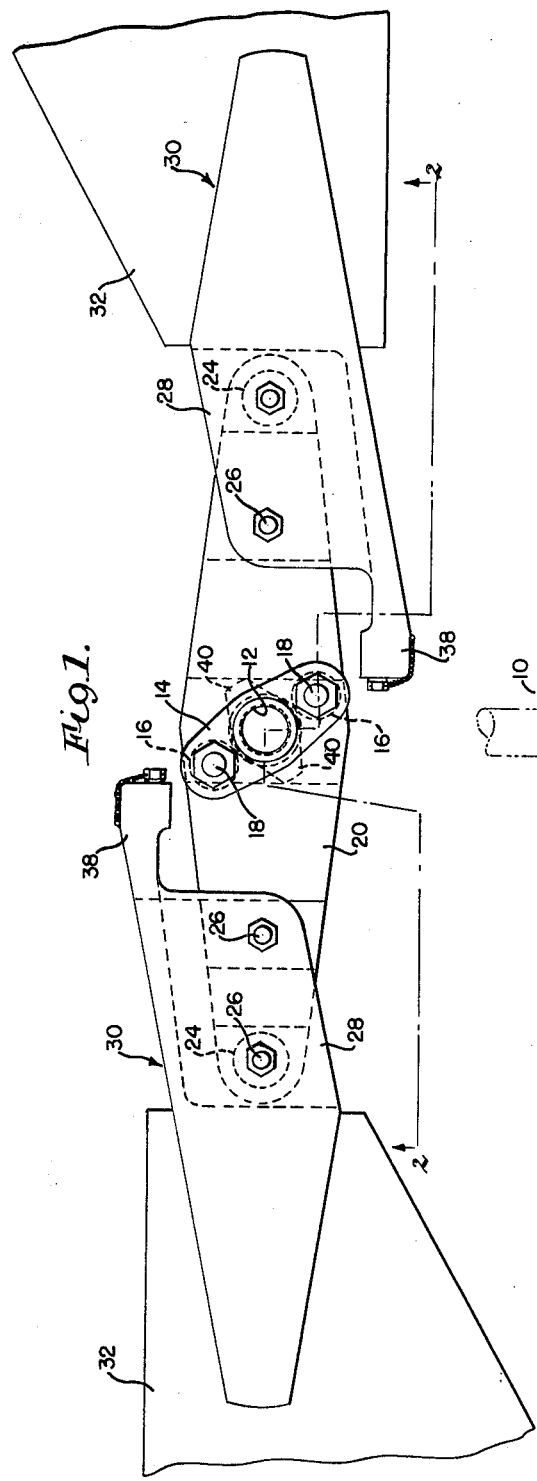
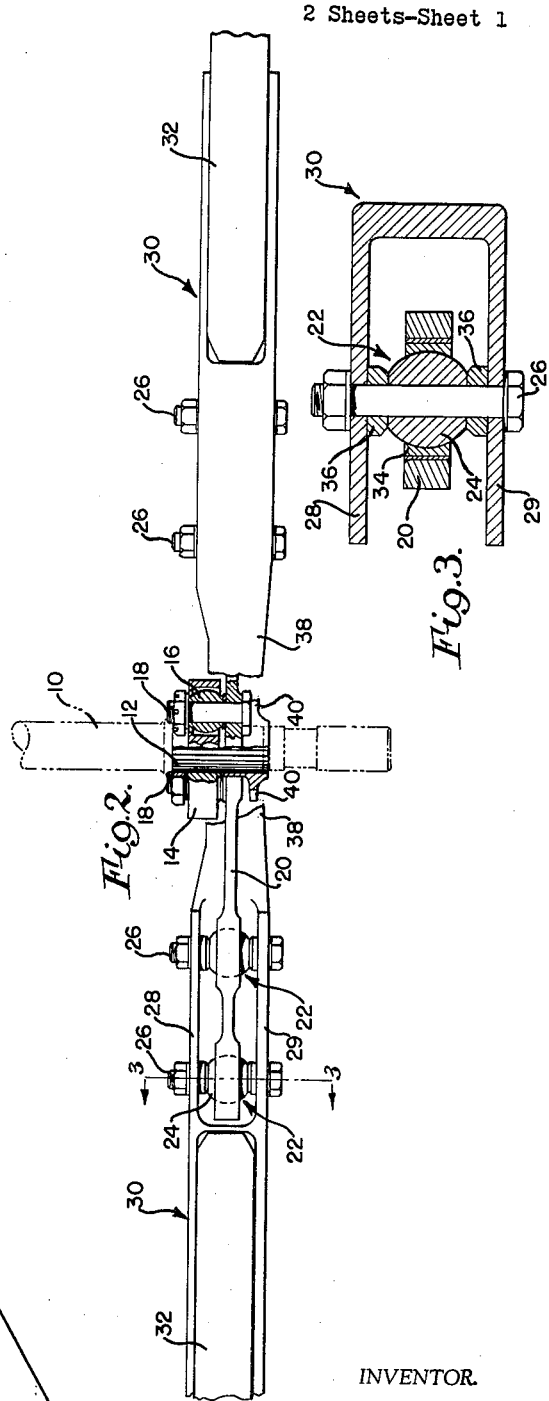
INVENTOR.
JAN MEIJER DREES
WESLEY L. CRESAP
BY
Beau, Brooks, Buckley & Beau
ATTORNEYS

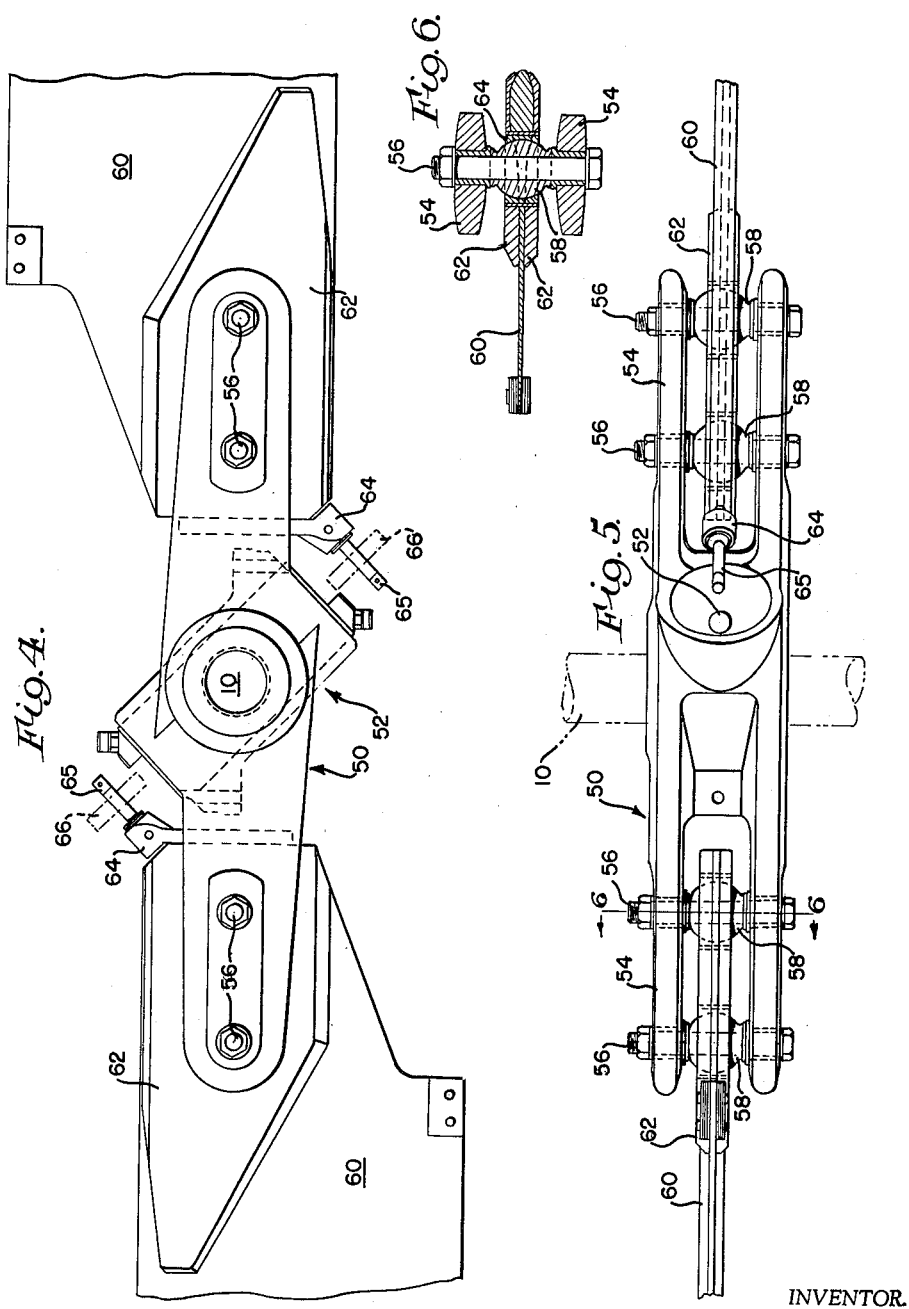

United States Patent Office 3,193,019
Patented July 6, 1965

3,193,019
ROTOR SYSTEM
Jan Meijer Drees, Dallas, and Wesley L. Cresap, Fort Worth, Tex., assignors to Bell Aerospace Corporation, Wheatfield, N.Y.
Filed June 5, 1964, Ser. No. 372,938
1 Claim. (Cl. 170—160.27)

This invention relates to rotary wing aircraft, and more particularly to rotor constructions therefor and retention means for mounting the variable pitch blades of the rotors thereof.

The present invention is applicable to rotary wing aircraft systems of the type permitting no lead-lag freedom of the rotor blade; such as for example in the so-called two-bladed semi-rigid type rotor; the multibladed universally mounted rotor; and in fact, to all so-called rigid type rotors. The present invention features provision of a rotor construction of high chordwise stiffness in the region of the blade roots so as to reduce chord stresses therein, while at the same time providing a structure which is relatively slim and flexible in the beamwise direction so as to be of low frontal area and aerodynamic drag, and to reduce beam loads on the hub structure.

Prior rotor systems typically position the blade-attached portion of the rotor head concentric with the mast-attached portion of the rotor head; and anti-friction bearings are disposed between the two aforementioned portions, such as in the manner shown in U.S. Patent No. 2,949,965 (FIG. 3, item 35). This type of "concentric hinge" construction necessarily provides for approximately equal stiffness in the vertical or beamwise direction and in the horizontal or chordwise direction; whereas as explained hereinabove it has been found desirable in multibladed, semi-rigid rotors to provide beamwise softness in combination with chordwise stiffness. In the concentric type of rotor hinge construction as aforesaid it is extremely difficult, if not impossible, to provide both features, even though for example the blade grip (item 35 in the above mentioned patent) may be designed so as to contribute more to chordwise stiffness than to beamwise stiffness, because the cylindrical spindle portion (34) thereof must be necked down as illustrated, to enter the bearing (36). It is of course to be appreciated that the degree of stiffness is more significant inboard than outboard, corresponding to the magnitude of the moments at the respective locations.

As previously indicated, the present invention contemplates a novel hub and blade grip arrangement whereby improved facility is provided for designing into the hub and blade retention mechanism the desired chordwise stiffness as well as any desired degree of beamwise softness; and therefore a specific object of the invention is to provide in a rotor system as aforesaid an improved, mechanically simple, blade-to-hub retention system.

Another object is to provide an improved blade retention mechanism as aforesaid which features, in combination, high in-plane stiffness throughout the blade mounting mechanism; low construction height and low aerodynamic drag; and low weight.

Another object is to provide an improved blade retention system as aforesaid which accommodates the incident centrifugal loads while minimizing friction effects and control loadings about the blade pitch change axis.

Another object of the invention is to provide an improved combination pitch change bearing and blade retention system as aforesaid, featuring improved chordwise (or in-plane) stiffness, thereby preventing mechanical instability and reducing the blade in-plane oscillatory loads.

Another object is to provide an improved mechanism as aforesaid, taking advantage of the fact that the beamwise stiffness throughout the blade retention system will preferably be much lower than the chordwise stiffness, thereby employing a structure of relatively low height with consequent gains against aerodynamic drag and other functional complications, and whereby the load carrying components of the mechanism may be shaped to eliminate "stress raiser" cross-sectional changes.

Still another object is to provide an improved mechanism as aforesaid featuring mechanical simplicity, reduction in number of component parts, low weight, and low cost of production and maintenance.

Another more specific object is to provide an improved mechanism for the above stated purposes employing a plurality of spherically surfaced bearing devices, spaced apart along the blade pitch change axis and mounted and arranged so as to retain the blade and hub assembly while providing the features and advantages aforesaid.

Another object is to provide an improved mechanism aforesaid employing yieldable bearing race components thereby automatically providing even distribution of the centrifugal loads against the respective bearing devices.

Other objects and advantages of the invention will appear from the description hereinbelow and the accompanying drawing wherein:

FIG. 1 is a fragmentary plan view illustrating by way of example one form of rotor hub and blade retention mechanism of the present invention;

FIG. 2 is a combination section and side elevational view of the mechanism of FIG. 1; taken as suggested by line 2—2 thereof;

FIG. 3 is a section taken as suggested by line 3—3 of FIG. 2;

FIG. 4 is a view corresponding to FIG. 1 but of a modified form of construction;

FIG. 5 is a side elevational view of the construction of FIG. 4; and

FIG. 6 is a section taken as suggested on line 6—6 of FIG. 5.

FIGS. 1 and 2 illustrate the invention as being embodied in a rotor construction adapted to be mounted on a drive shaft 10 by means of a splined hub 12 which includes a transverse trunnion bearing device 14 extending across the axis of the drive shaft 10. The trunnion device is shown to include a pair of spherical bearings 16—16, the ball portions of which are connected by means of bolts 18—18 to a yoke plate 20 which is thereby suspended below the trunnion device also in an attitude transverse to the drive shaft 10 and to extend diametrically therefrom. The yoke plate 20 is of course centrally apertured to accommodate the drive shaft 10 therethrough, and carries adjacent each outer end thereof a pair of spherical bearings as are indicated generally at 22. The ball portions 24 of these bearings are transfixed by bolts 26 and are thereby mounted between the upper and lower flange portions 28, 29, respectively, of clevis-shaped blade grip members 30 into which the blade root ends 32 are fitted and fastened by any preferred means.

As shown in more detail in FIG. 3, the bearing assemblies 22 include suitable race portions 34 carried by the yoke plate and embracing the ball portions 24; and spacers 36 may be provided to rigidize the mountings of the spherical bearings relative to the blade grips 30—30. Thus, it will be seen that by this means the blades 32—32 are mounted on the extending end portions of the yoke 20 to be pivotal thereon about the long axes of the blades for blade pitch change purposes, while at the same time being retained against the centrifugal forces imposed thereon during operation of the rotor. For control of the blades in pitch the blade grips 30—30 are provided with control horns 38 into which connect suitable blade pitch control mechanisms (not shown), as is well known in the art.

It will be appreciated that the mounting of the yoke plate 20 relative to the trunnion plate 14 enables the rotor assembly to "see-saw" relative to the drive shaft 10, for purposes which are also well known in the art. The axis of rocking the rotor assembly relative to the trunnion plate is shown in the drawing herewith as being disposed at an angle of approximately 35 degrees away from a transverse axis normal to the long axis of the rotor system to attain the well known "delta-three hinge" effect. However, in lieu thereof the trunnion bearing may be disposed to extend at right angles to the long axis of the rotor, to provide a simple "see-saw" flapping effect, if preferred.

It should be noted that the above described configuration uses spherical bearings for both pitch change and flapping, in addition to essentially flat plate construction of the basic rotor parts, thus contributing to simplicity and low cost of manufacture.

As explained hereinabove, it is a particular feature of the present invention that the blade retention system facilitates design so that all essential components thereof are of substantial width dimensions in plan view while being at the same time of minimum thickness or vertical height dimensions. This is because the relatively large and rugged spherical bearing members may occupy the bulk of the vertical height of the mechanism, while the yoke 20 and blade grip 30 may be of vertically thin sectional form, but of substantial horizontal width dimensions. Hence, chordwise rigidity in combination with beamwise flexibility is more readily attainable than in connection with devices of the prior art. The yoke plate 20 may readily be of any desired plan view width dimension throughout its extent from the region of the drive shaft to the region where it carries the spherical bearings 22—22, and shaped to avoid any "stress-raiser" sectional form changes. Similarly, the upper and lower flange portions 28, 29 of the blade grip device 30 may be constructed of any desired sectional form and plan view width dimensions, so as to provide the desired chordwise stiffness therethroughout; and the spherical bearings 22—22 of each blade retention mechanism may readily be spaced apart sufficiently to insure a plan-view rigid cantilever mounting of the blade relative to the yoke plate 20. Notwithstanding the advantages just referred to, the retention mechanism provides absolute freedom for pivoting of the blade relative to the yoke plate for pitch change purposes, while at the same time the yoke plate may be formed to any desired vertical thickness dimension so as to permit it to flex to any desired degree under service conditions, thereby providing the beam-wise flexibility advantages referred to hereinabove. As indicated at 40—40, the hub device may include flapping limit stop devices under the yoke plate to limit the degree of flapping in either direction, if desired.

FIGS. 4–6 illustrate a modified version of rotor construction embodying the features of the present invention, wherein the drive shaft 10 supports a rigid form of yoke designated generally at 50 by means of a trunnion arrangement which is indicated generally at 52, whereby the yoke 50 is free to rock, within limits, about a "delta-three" hinge relative to the drive shaft. As mentioned hereinabove, however, the trunnion axis may in lieu thereof be disposed directly crosswise of the long axis of the rotor to provide a simple "see-saw" hinge effect, the trunnion and "see-saw" arrangements referred to herein forming no part of the present invention.

As shown in FIGS. 5, 6, the rigid yoke member 50 includes clevis-shaped end portions 54, 54 which in each case support by means of bolts 56 pairs of spherical bearings 58—58 of the type referred to in connection with FIGS. 1–3. The rotor blades are illustrated at 60—60 to be enclosed at their root ends by re-enforcing blade grip devices 62 which carry the races 64 embracing the spherical bearings 58 (FIG. 6); and thus the blades 60—60 are mounted relative to the yoke 50 so as to be freely pivotable about the long axes of the blades for pitch change purposes. It will be apparent that the yoke and blade grip components may be width-dimensioned in plan view, and the paired bearings 58—58 may be so spaced apart, as to provide the requisite chordwise stiffness of the entire assembly throughout the blade retention mechanism, while still permitting the latter to be constructed of minimum height or vertical thickness. To control the blades about their pitch axes, control horns as indicated at 64 may be provided to carry pins 65 extending therefrom for connection to conventional pitch control mechanism as indicated at 66 (FIG. 4). Whereas in the drawing herewith only two spherical bearings are illustrated in conjunction with each blade mounting-retention mechanism, additional bearings may of course be employed therebetween, if preferred. Also, it will be appreciated that in lieu of the use specifically of "ball" bearings as illustrated at 24, 58, herewith, any other suitable form of bearings having parti-spherical or cylindrical surfaces could be employed to provide the requisite retention and pitch change pivot action. The races 34, 64 (of FIGS. 3 and 6, respectively) may preferably be formed of some suitable wear-resistant but somewhat yieldable or plastic or elastic material, such as nylon or Teflon or the like, whereby the individual bearings of each retainer mechanism will be automatically self-adjusting so as to evenly divide between themselves the centrifugal loads transmitted through the blades. Thus the bearing life characteristics will be improved.

Therefore, it will be appreciated that the blade mounting and retention mechanism of the present invention features the use of mechanically simple and light weight parts, which when assembled provide a low silhouette structure of minimum aerodynamic drag characteristics. This low drag feature permits of location of the blade mounting-retention mechanism further outboard on the blade, where loads are lower and stiffness requirements are less. Thus, this feature renders the mechanism particularly adaptable to advantage for example in connection with semi-rigid rotor systems employing relatively long narrow blades. Also, the low drag and the high chordwise stiffness of the rotor system of the invention renders is particularly advantageous when employed in high speed rotors, because mechanical instability is prevented and in-plane oscillatory loads are reduced. Furthermore, in the case of the present invention the designer can afford to employ a relatively long "hinge" mechanism for mounting the blade relative to the yoke; as by disposing the bearings of such unit at substantial distances apart (thereby attaining increased mechanical advantage) while still maintaining an overall low silhouette.

It will of course be appreciated that athough only a few forms of the invention have illustrated and described in detail hereinabove, various changes may be made therein without departing from the spirit of the invention or the scope of the following claim.

We claim:

In a rotor system, a drive shaft, a hub having a central portion engaging said drive shaft for rotation therewith, and having a pair of diametrically opposed ears extending outwardly from said central portion, an elongate yoke plate having a central opening clearing said drive shaft, said ears of the hub being oriented to extend generally transversely of said yoke plate, a spherical bearing journalled in each ear, a through-bolt engaging each bearing and connecting same to said yoke plate whereby the yoke plate is pivotally connected to said hub for see-saw motion about an axis generally transverse of the yoke plate, a plurality of spherical yoke bearings arranged in mutual alignment along each end of said yoke plate and in substantially aligned relation, a through-pin engaging each such yoke bearing, a pair of blade grip members each of clevis form presenting upper and lower flanges between which a corresponding end of the yoke plate is received, said through-pins extending through the upper and lower flanges of a respective blade grip member to pivotally connect each blade grip member to the yoke plate.

References Cited by the Examiner
UNITED STATES PATENTS

| | | | |
|---|---|---|---|
| 1,682,893 | 9/28 | Cierva | 170—160.52 |
| 2,829,721 | 4/58 | Gebhard | 170—135.24 |
| 2,830,669 | 4/58 | Klockner | 170—160.42 |
| 2,925,129 | 2/60 | Yuan et al. | 170—135.4 |
| 3,149,802 | 9/64 | Wigal. | |

JULIUS E. WEST, *Primary Examiner.*